Aug. 31, 1954 — O. L. BOCK — 2,687,747
FLUE CONDUIT WITH INTERNAL HEAT TRANSFER ELEMENTS
Filed May 22, 1951
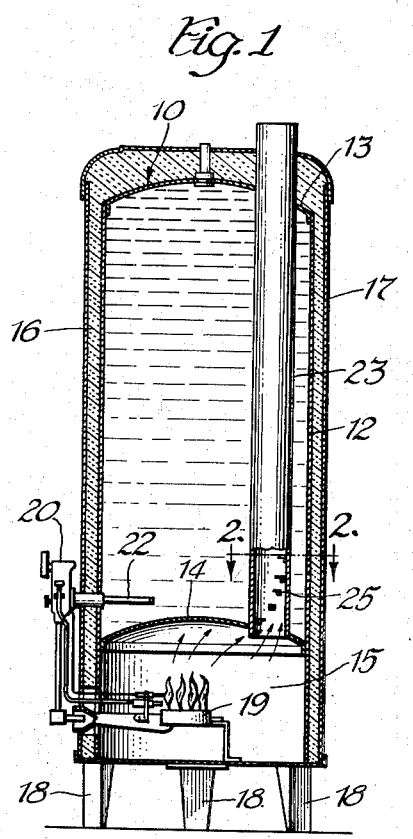
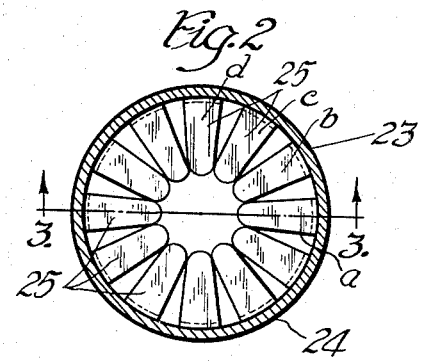
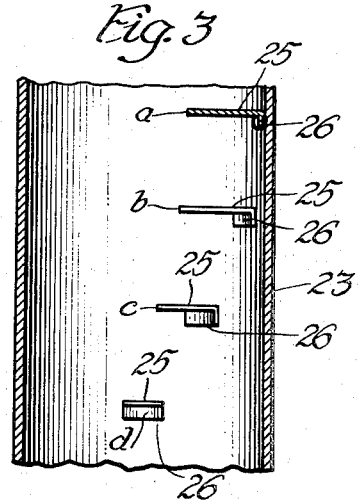
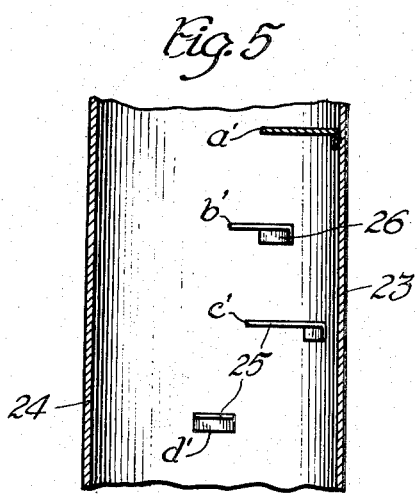
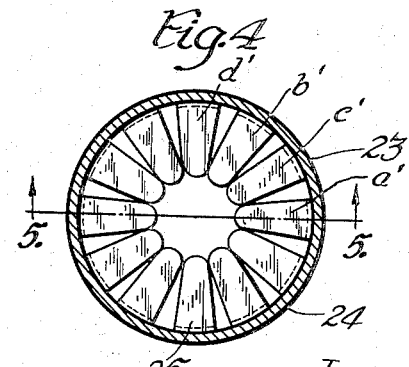
Inventor
Oscar L. Bock Patented Aug. 31, 1954

2,687,747

UNITED STATES PATENT OFFICE 2,687,747

FLUE CONDUIT WITH INTERNAL HEAT TRANSFER ELEMENTS

Oscar L. Bock, Madison, Wis., assignor to Bock Corporation, Madison, Wis., a corporation of Wisconsin Application May 22, 1951, Serial No. 227,547

3 Claims. (Cl. 138—38)

This invention relates to flue baffles adapted to heat transfer, and more particularly to flue baffles constituting a series of baffle elements mounted in effective heat transfer relationship within a metallic flue for accomplishing the efficient transfer of heat from flue gases to a surrounding heat absorbing or utilizing medium.

In heat transfer and heat utilizing apparatus, such, for example, as water heaters suited to domestic and industrial use, it is an element of good design to utilize a metallic tube as a heat conductive flue, and to have that flue extend in heat transferring relationship through the water or medium to which the heat is to be transferred. With such an arrangement, the combustion gases are cooled, and the heat therefrom is transferred to the medium which is sought to be heated.

My invention is concerned with the improvement of the efficiency of the heat transfer from the combustion gases to the heated medium, and the consequent reduction of heat losses through heat carried up the chimney by the combustion gases. In the past, and in similar general arrangements of apparatus, edgewise wound metal baffle strips have been placed within metallic flues to establish a spiral path for the flow of combustion gases, thereby to prolong and lengthen the heat transferring contact of such gases with the metallic flue surface. Such spiral strips were, however, preformed and mounted in a manner allowing for expansion and contraction of the strips, and such that the strips were not in good heat transferring contact with the flues along their lengths. Thus, the benefits of such strips were gained almost entirely from their extensions of the paths of contact of the gases with the flue surfaces.

My invention, on the other hand, has for an object the use of a series of baffle elements arranged to extend the time and path of contact between the flue gases and a heat conductive flue, and each of which baffle elements is heat conductive and secured in good heat conductive contact to the internal surface of the flue, so that those baffle elements themselves serve to absorb heat from the flue gases and transfer it effectively and efficiently to the medium which is being heated.

As another object, this invention has within its purview the provision of a metallic flue having a series of baffle elements secured to the internal surface thereof, as described, and wherein the structure and arrangement of the flue and baffle elements are such that the baffle elements can readily be secured to the internal flue surface by spot welding.

In carrying my invention into effect, I have further provided arrangements of baffle elements in a flue which not only affords an extended path for the passage of flue gases in contact with the flue and baffles, but also effectively increases the heat transmitting flue area from which heat is efficiently transferred from the flue gases to the medium being heated.

Other objects and advantages of the invention will be apparent from the following description and the accompanying drawings in which similar characters of reference indicate similar parts throughout the several views.

Referring to the single sheet of drawings:

Fig. 1 is a side sectional view of heat transfer apparatus in the form of a hot water heater embodying a preferred form of my invention;

Fig. 2 is an end sectional view drawn to a larger scale than Fig. 1 and taken substantially at a position indicated by a line 2—2 in Fig. 1 and in the direction of the arrows;

Fig. 3 is a side sectional view taken substantially on a line 3—3 of Fig. 2;

Fig. 4 is a view similar to Fig. 2 showing a somewhat modified form of the invention; and Fig. 5 is a side sectional view taken substantially on a line 5—5 of Fig. 4.

In the exemplary embodiment of my invention which is depicted in the accompanying drawings for illustrative purposes, I have shown its adaptation to heat transfer apparatus in the form of a water heater, wherein heat from combustion gases is passed through a flue for transfer to water in a tank. Although it is understood that the concepts and structure of this invention may have other applications, the principles and their structural application for the transfer of heat from flue gases to a heat absorbing medium are utilized and illustrated by the structure disclosed.

Considered generally and for environmental purposes in connection with the exemplary apparatus herein shown, the water heater depicted in Fig. 1 has a generally cylindrical water tank 10, an outer shell 12 of which is capped by a top wall 13 and extends downwardly below a bottom wall 14 to define a combustion chamber 15. The tank 10 is preferably covered by heat insulating material 16 which is disposed within an outer metal cover 17. The ensemble comprising the heat insulated tank is supported by legs 18.

A burner 19 for a suitable and selected fuel is mounted in the combustion chamber 15 below the bottom wall 14 of the water tank. In the present instance, a gas burner is shown, the fuel supply for which is controlled by an aquastat 20 which embodies electrical control elements responsive to a temperature actuated element 22 extending into, and actuated by the temperature of the water in the tank 10.

In addition to heat transferred to the water in the tank through the bottom wall 14, a metal flue 23 extends through the top and bottom walls 13 and 14 of the tank at a position to be surrounded by the water in the tank and so that the hot combustion or flue gases from the combustion chamber 15 pass therethrough to impart heat to the water. The flue 23, in the present instance, comprises an elongated, open ended and cylindrical metal tube having a relatively thin heat conductive wall 24.

It is practically axiomatic that the efficiency of such apparatus is promoted by effecting the maximum possible heat transfer from the flue gases to the water or other medium being heated. One manner of accomplishing such heat transfer is to prolong the contact of the flue gases with the heat conductive surface of the flue wall. Another is to provide increased heat absorbing surface in the flue and promoting the effective and efficient transfer of heat from that surface to the medium being heated. My invention effectively comprehends both such manners of securing efficient heat transfer.

In the form shown in Figs. 1, 2 and 3, metal baffle elements 25 are individually secured to the inner surface of the wall 24 of the flue and project inwardly in substantially radial relationship to such wall. In order to afford effective heat conductivity from the baffle elements to the flue wall, each baffle element 25 has an integral and angularly formed flange 26 at its outer end which is in heat transferring contact with the flue wall 24 at all times and secured to the wall, as by spot welding, to support the baffle element and maintain the efficiency of the heat transferring contact.

In order to provide for good heat conductive contact between the baffle elements and flue wall at all times, and so as to insure substantial surface area contact between the flanges 26 of the baffle elements and the flue wall without complicated or expensive forming operations and without the necessity for concern regarding the effects of expansion and contraction of the flue and the baffle elements, those flue elements are relatively narrow. For the sake of simplicity, they are generally flat and mounted with their flat baffle surfaces substantially normal to the longitudinal axis of the flue. In order to provide substantial surface areas in the baffle elements for the deflection of flue gases and particularly for the absorption of heat from the flue gases, the baffle elements are longer than their width. In the disclosed structure the baffle elements are shorter than the radius of the flue, but their length is greater than twice the width and is such that they extend more than one fourth of the way across the interior of the flue. These proportions and my disclosed arrangement of parts afford effective operating characteristics, in that they provide for effective and efficient heat transfer without checking the flue to an extent which is detrimental to combustion, and so as to cause the production of carbon monoxide gas.

In the form shown in Figs. 1, 2 and 3, the flue elements follow a spiral pattern in the flue. That is, they are sequentially displaced longitudinally and circumferentially from one another with substantial uniformity of spacing and direction to define a spiral path. Figs. 2 and 3, when considered together, show the relative positions of baffle elements a, b, c, and d circumferentially and axially of the flue. This pattern is continued throughout the length of the flue.

A modified arrangement of the baffle elements is illustrated in Fig. 4 and 5. The baffle elements designated a', b', c' and d' indicate the general spiral trend of the baffle pattern, and also show that sequentially the baffles are staggered relative to one another.

In both forms of any baffle arrangement and in others that might be devised, the baffle elements are in permanent heat conductive relationship to the flue. They absorb heat from the flue gases by contact therewith and effectively and efficiently transfer the heat to the flue and heat absorbing medium. Without unduly obstructing the flue, they effect limited turbulence of the flue gases and tend to extend the travel of such gases in their travel through the flue. Thus, they prolong and improve the contact of the flue gases with both the baffle elements and flue, so as to afford more efficient heat transfer to the heat absorbing medium.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In heat transfer apparatus wherein heat is transferred from combustion gases to a heat absorbing medium surrounding the exterior of a tubular flue, the combination comprising an elongated and tubular metallic flue of predetermined diameter through which heat from the combustion gases is transferred to the heat absorbing medium in contact with the exterior surface of the flue, and a series of metallic heat transfer elements of like size and shape welded individually and directly in heat transferring relationship to the internal surface of the flue in a spiral pattern so that the heat transfer elements present substantial areas and act effectively to absorb and transmit heat from the combustion gases to the heat absorbing medium without unduly reducing the flue opening for the passage of combustion gases, the surfaces of said heat transfer elements each being substantially normal to the longitudinal axis of the flue, said heat transfer elements being shorter than the radius of the flue and having widths of only a small fraction of the flue circumference so that they each occupy less than one-eighth of the area of the flue in a plane laterial to the longitudinal axis of the flue and at their respective levels, and said heat transfer elements also being arranged in a regular sequence which embodies substantially uniform axial and radial spacing of the heat transfer elements within the flue.

2. In heat transfer apparatus as defined in claim 1, each of said heat transfer elements comprising a substantially flat metal strip having a length greater than its width and formed to provide a flange adapted to be spot welded to the inner flue surface with the longitudinal axis of the heat transfer element extending radially into the flue.

3. In heat transfer apparatus wherein heat is transferred from combustion gases to a heat absorbing medium surrounding the exterior of a tubular flue, the combination comprising an elongated and tubular metallic flue through which heat from combustion gases passing therethrough is transferred to a heat absorbing medium in contact with the exterior surface thereof, and a series of metallic heat transfer elements having angularly disposed flanges thereon, which flanges are individually and directly spot welded to the internal flue surface so that those heat transfer elements extend into the flue and act effectively to absorb and transfer heat from combustion gases which contact those elements to and through the flue without unduly reducing the flue opening for the passage of combustion gases, and said heat transfer element forming a series extending longitudinally of the flue with each flue element of the series displaced axially and circumferentially of the flue from the one preceding so that they form a pattern such that the spot welding of the flanges to the internal surface of the flue is accomplished sequentially without having the secured heat transfer elements interfere with the welding of others.

References Cited in the file of this patent

UNITED STATES PATENTS

| Number | Name | Date |
|---|---|---|
| 164,306 | Kelshaw | June 8, 1875 |
| 1,528,859 | Taylor | Mar. 10, 1925 |
| 1,720,244 | Smith | July 9, 1929 |
| 1,877,567 | Erbes | Sept. 13, 1932 |
| 1,947,606 | Lonergan | Feb. 20, 1934 |
| 2,183,561 | Hamblin | Dec. 19, 1939 |
| 2,558,816 | Bruynes | July 3, 1951 |
| 2,565,220 | Gaugler | Aug. 21, 1951 |